(12) United States Patent
Jörn

(10) Patent No.: US 8,052,087 B2
(45) Date of Patent: Nov. 8, 2011

(54) DEVICE FOR IMPROVING THE BREATHING AIR QUALITY IN AN AIRCRAFT CABIN

(75) Inventor: Paul Jörn, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 527 days.

(21) Appl. No.: 12/105,781

(22) Filed: Apr. 18, 2008

(65) Prior Publication Data

US 2009/0044800 A1 Feb. 19, 2009

Related U.S. Application Data

(60) Provisional application No. 60/912,946, filed on Apr. 20, 2007.

(30) Foreign Application Priority Data

Apr. 20, 2007 (DE) .................. 10 2007 018 773

(51) Int. Cl.
*B64D 13/08* (2006.01)

(52) U.S. Cl. ............ 244/118.5; 244/1 R; 261/28; 62/239

(58) Field of Classification Search ............... 244/118.5, 244/1 R; 261/107, 104, DIG. 65, DIG. 2, 261/28; 62/239, 243, 244; 236/44 R, 44 A
See application file for complete search history.

(56) References Cited

U.S. PATENT DOCUMENTS

| | | | | |
|---|---|---|---|---|
| 3,923,482 A * | 12/1975 | Knab et al. | | 55/412 |
| 4,559,939 A * | 12/1985 | Levine et al. | | 128/201.28 |
| 4,832,287 A * | 5/1989 | Werjefelt | | 244/118.5 |
| 5,007,421 A * | 4/1991 | Stewart | | 128/204.18 |
| 5,278,937 A * | 1/1994 | Alix et al. | | 392/402 |
| 5,524,848 A * | 6/1996 | Ellsworth | | 244/118.5 |
| 5,699,983 A * | 12/1997 | Ellsworth | | 244/118.5 |
| 5,809,999 A * | 9/1998 | Lang | | 128/200.24 |
| 5,944,284 A * | 8/1999 | Bardel | | 244/118.5 |
| 6,340,024 B1 * | 1/2002 | Brookman et al. | | 128/201.25 |
| 6,491,254 B1 * | 12/2002 | Walkinshaw et al. | | 244/118.5 |
| 6,672,541 B2 * | 1/2004 | Fieldson et al. | | 244/118.5 |
| 6,793,205 B2 * | 9/2004 | Eom | | 261/142 |
| 7,481,214 B2 * | 1/2009 | Eilers | | 128/200.24 |
| 7,758,026 B2 * | 7/2010 | Kulcke et al. | | 261/141 |
| 2003/0042629 A1 * | 3/2003 | Eom | | 261/81 |
| 2003/0141412 A1 * | 7/2003 | Fieldson et al. | | 244/118.5 |
| 2007/0257383 A1 * | 11/2007 | Chan | | 261/107 |
| 2008/0001026 A1 * | 1/2008 | Hoffjann et al. | | 244/58 |

FOREIGN PATENT DOCUMENTS

| | | |
|---|---|---|
| DE | 19531916 | 3/1997 |
| DE | 10314890 | 8/2004 |
| DE | 10340984 | 3/2005 |
| DE | 10361271 | 7/2005 |
| DE | 102005029226 | 12/2006 |
| EP | 0808769 | 11/1999 |

* cited by examiner

*Primary Examiner* — Benjamin P Lee

(74) *Attorney, Agent, or Firm* — Wood, Herron & Evans, LLP

(57) ABSTRACT

A device for improving the breathing air quality for the crew and/or the passengers in an aircraft cabin includes an oxygen source, a water source and a feed line, wherein the feed line is connectable to the oxygen source and the water source in order to oxygenate and/or humidify air that is introduced into the feed line. The feed line is further connected to an inlet port of a locally delimited area of the aircraft cabin and adapted so as to feed oxygenated and/or humidified air to the locally delimited area of the aircraft cabin.

10 Claims, 3 Drawing Sheets

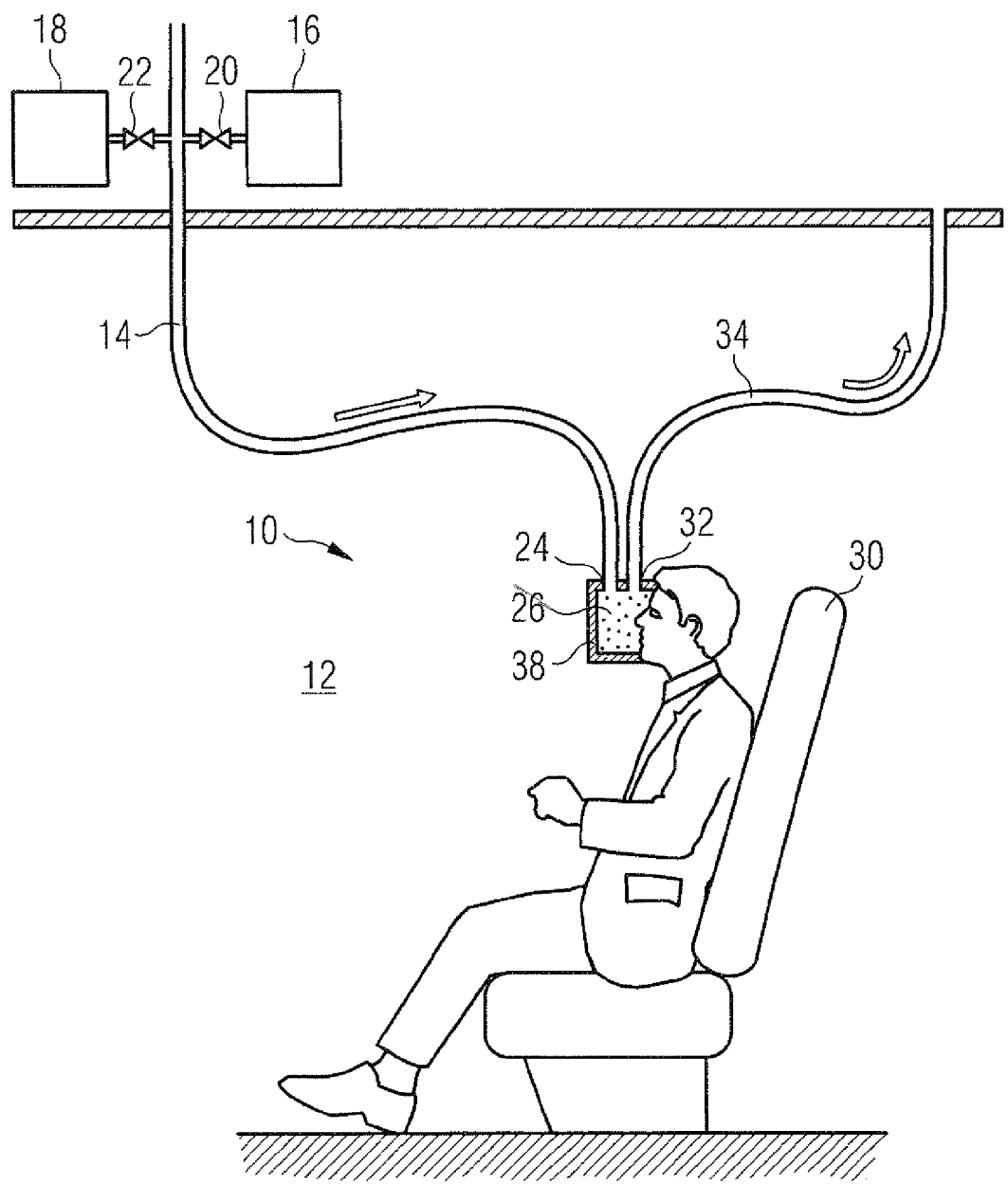

DEVICE FOR IMPROVING THE BREATHING AIR QUALITY IN AN AIRCRAFT CABIN

This application claims priority to U.S. Provisional Patent Application No. 60/912,946, filed on Apr. 20, 2007; and/or German Patent Application No. 102007018773.6, filed on Apr. 20, 2007.

TECHNICAL FIELD

The invention relates to a device for improving the breathing air quality in an aircraft cabin.

BACKGROUND

Because of the lower aerodynamic drag at high altitudes, a higher cruising altitude of an aircraft fundamentally allows a reduction of the fuel consumption of the aircraft engines. There is therefore a trend towards designing commercial aircraft for flights at increasingly high cruising altitudes of up to 43,000 feet (ca. 13100 m). Commercial aircraft currently in operation comprise a pressurized cabin, the internal pressure of which during cruising is held by means of an air-conditioning system, which is supplied with engine bleed air, at a pressure level that is higher than the ambient pressure, i.e. the reduced atmospheric pressure at high altitudes.

In order to limit the fuselage loads resulting from the pressure difference between the ambient pressure and the higher cabin internal pressure as well as the work that the air-conditioning system has to do in order to maintain the desired pressure level in the interior of the aircraft cabin, the cabin internal pressure of a commercial aircraft during cruising of the aircraft is not held at a pressure level corresponding to the atmospheric pressure at sea level. Rather, the pressure in the interior of the cabin of a commercial aircraft during cruising of the aircraft, i.e. when the aircraft is situated at cruising altitude, usually corresponds approximately to the atmospheric pressure at a height of 8000 feet (ca. 2400 m).

In principle, the oxygen partial pressure of the air in the interior of the aircraft cabin that arises in the case of a cabin internal pressure corresponding approximately to the atmospheric pressure at a height of 8000 feet is high enough to guarantee an adequate supply of oxygen for the crew and passengers on board the aircraft. However, compensating for the pressure difference between the cabin internal pressure during cruising of the aircraft, which corresponds approximately to the atmospheric pressure at a height of 8000 feet, and the pressure level on the ground, which usually corresponds to or lies slightly below the atmospheric pressure at sea level, requires the performance of an adaptation process by the human body. Particularly for persons who react sensitively to a reduced oxygen partial pressure, the performance of this adaptation process may be taxing and lead to symptoms such as dizziness or even fainting. These symptoms may be additionally intensified by some other illness of an affected person or by stress.

Besides the reduced oxygen partial pressure, the low air humidity in the interior of an aircraft cabin may lead to health problems in sensitively reacting persons. In order to minimize the condensing-out of water on the cold outer skin of the fuselage of the aircraft, the air humidity in the aircraft cabin is kept artificially low and in a front fuselage portion of the aircraft is only approximately 5%. Such a low air humidity is generally perceived as uncomfortable and may lead to drying-out and irritation of the mucous membranes.

As a result of the reduced oxygen partial pressure and the low moisture content of the breathing air in the interior of the aircraft cabin, the crew and the passengers of a commercial aircraft during the flight are subject as a whole to increased physical stress. The extent to which a person perceives this stress however depends upon the individual sensitivity of the person to the special ambient conditions on board an aircraft and upon the flying time. The negative effects of the increased physical stress are therefore perceived to a greater extent by persons who react sensitively to a reduced oxygen partial pressure and low air humidity, especially on long-haul flights.

For the improved comfort of crew members and passengers on board an aircraft and in order to prevent health problems that are caused by a reduced oxygen partial pressure in an aircraft cabin, EP 0 808 769 A2 proposes to supply air which is oxygenated by means of an oxygen concentrator to an aircraft cabin. With the aid of the system described in this document the oxygen content of the air to be supplied to the aircraft cabin may be increased to 25 to 35% by volume. The oxygen enrichment system known from EP 0 808 769 A2 makes it possible to increase the well-being of the crew members and the passengers on board the aircraft. What is more, the pressure difference between the ambient pressure during the flight and the raised cabin internal pressure and hence the stresses of the fuselage resulting therefrom may be limited because the raising of the oxygen partial pressure in the aircraft cabin is realized exclusively by means of oxygen enrichment of the air to be supplied to the cabin and not by means of an increase of the cabin pressure.

An important drawback of the system described in EP 0 808 769 A2 is however that in order to increase the oxygen partial pressure in the aircraft cabin a large quantity of oxygen has to be produced. The oxygen concentrator, which is operated permanently under a high load, therefore involves a high maintenance outlay. The individual components of the system as well as the entire system are moreover very heavy. If instead of the oxygen concentrator described in EP 0 808 769 A2 an oxygen reservoir is used to provide the oxygen needed to enrich the air to be supplied to the aircraft cabin, this oxygen reservoir is likewise very heavy and moreover takes up a large amount of installation space.

The underlying object of the invention is therefore to provide a lightweight and compact device for improving the breathing air quality in an aircraft cabin.

SUMMARY OF THE INVENTION

To achieve this object, a device according to the invention for improving the breathing air quality in an aircraft cabin comprises an oxygen source, a water source and a feed line, wherein the feed line is connectable to the oxygen source and to the water source in order to oxygenate and/or humidify air that is introduced into the feed line for example from an air outlet port of an aircraft air-conditioning system. For connecting the feed line to the oxygen source and the water source, the device according to the invention for improving the breathing air quality in an aircraft cabin may comprise valves that are suitable for this purpose, such as for example electronically controllable solenoid valves that enable a selective connection of the feed line to the oxygen source and/or the water source. Depending on requirements, the air flowing through the feed line may then be oxygenated and/or humidified. Preferably the device according to the invention for improving the breathing air quality enables a purposeful adjustment of the desired oxygen partial pressure and/or of the desired moisture content of the breathing air provided by the device according to the invention. Control of these parameters may be realized for example by means of a corresponding control of valves, which are disposed between the feed line and the oxygen source and/or the water source, by means of an electronic control unit.

According to the invention, the feed line of the device according to the invention for improving the breathing air quality in an aircraft cabin is connected to an inlet port of a locally delimited area of the aircraft cabin and is adapted so as to feed oxygenated and/or humidified air to the locally delimited area of the aircraft cabin. In other words, the device according to the invention for improving the breathing air quality in an aircraft cabin and in particular the feed line of the device is so designed and positioned that only a locally delimited area of the aircraft cabin, but not a region of the aircraft cabin surrounding the locally delimited area, is supplied with breathing air of improved quality.

With the aid of the device according to the invention persons who react to the reduced oxygen partial pressure and the low air humidity in an aircraft cabin with health problems or persons who, in order to preserve their functional capacity, are to be subject to the lowest possible additional physical stresses, such as for example the pilots or other crew members, may where necessary be supplied with breathing air of improved quality. On long-haul flights in particular, the comfort of these persons may therefore be considerably improved.

As the device according to the invention supplies only a locally delimited area of the aircraft cabin with breathing air of improved quality, a number of advantages may be realized. Firstly, the device may be of a compact and lightweight construction. Secondly, where necessary breathing air of higher air humidity may be fed to selected persons on board the aircraft without this leading to excessive condensation of water in the cabin. Compared to a system that provides only oxygen enrichment of the air in an aircraft cabin, the device according to the invention therefore allows a marked increase in comfort for the persons supplied with breathing air of improved quality by the device according to the invention. If these persons are the pilots or other crew members, security on board the aircraft may therefore be heightened because the additional physical stress on these persons as a result of the low oxygen partial pressure and the low air humidity on board the aircraft is minimized.

In the locally delimited area of action of the device according to the invention for improving the breathing air quality the device may be used also as an emergency oxygen supply system in the event of a pressure loss in the aircraft cabin. Since in the event of a pressure loss in the aircraft cabin it is necessary to provide breathing air at a very high oxygen partial pressure, the device according to the invention for improving the breathing air quality is suitable for use as an emergency system particularly if it allows purposeful control of the oxygen partial pressure of the breathing air provided by the device. During normal operation, the device may then supply breathing air of "medically" improved quality, i.e. breathing air with a slightly increased oxygen partial pressure. During emergency operation, on the other hand, the device is capable of providing breathing air with the required high oxygen partial pressure. Alternatively, the device according to the invention for improving the breathing air quality may however be used as an additional device in combination with a conventional emergency oxygen supply system.

The feed line of the device according to the invention for improving the breathing air quality in an aircraft cabin may be connected to an inlet port of a separating device, which is adapted so as to separate the locally delimited area of the aircraft cabin from a region of the aircraft cabin that surrounds the locally delimited area. The separating device allows a particularly selective feed of the breathing air of improved quality into a locally delimited area of the aircraft cabin. It is consequently possible to minimize the oxygen- and the water consumption of the device according to the invention.

The separating device may be designed in the form of a person cabin that has room for one or more persons. For example, the person cabin may be a cabin that surrounds a seat or a row of seats, wherein a cabin wall may consist of a flexible membrane but also of a rigid material, such as for example a suitable plastics material or the like. The person cabin formed by the separating device may however alternatively be a defined area of the aircraft cabin, such as for example a first class area or a rest area for the crew members. A separating device designed in the form of a person cabin may have a closable access opening for entering and leaving the person cabin. It is however also possible to design the person cabin in such a way that it may be displaced if a person would like to enter or leave the cabin. The separating device of the device according to the invention for improving the breathing air quality in an aircraft cabin may also be designed in the form of a hood, which is capable of accommodating the head of a person, or a mask, which may be placed over the facial region of a person. The advantage, which a device for improving the breathing air quality in an aircraft cabin that is equipped with such a separating device has over a device having a separating device designed in the form of a person cabin, is its lower oxygen- and water requirement.

In a preferred form of construction of the device according to the invention for improving the breathing air quality in an aircraft cabin, the feed line is connected to an inlet port that is designed in the form of a nozzle. The inlet port designed in the form of a nozzle may open out directly into the aircraft passenger cabin and preferably be disposed in such a way that it discharges the breathing air of improved quality in the direction of the facial region of a person to be supplied. It is however alternatively also possible for an inlet port of a separating device, which may be fashioned in the form of a person cabin, hood or mask, to be designed in the form of a nozzle.

The device according to the invention for improving the breathing air quality in an aircraft cabin is preferably adapted so as to supply the locally delimited area of the aircraft cabin with the oxygenated and/or humidified air through the inlet port at a pressure that exceeds the pressure in the region of the aircraft cabin that surrounds the locally delimited area. By supplying the breathing air of improved quality at a raised pressure it is guaranteed that a person situated in the locally delimited area of action of the device according to the invention for improving the breathing air quality in an aircraft cabin is properly supplied with breathing air of improved quality even when the device does not comprise a separating device for separating the locally delimited area of action from a surrounding region of the aircraft cabin or the separating device is not completely sealed. The raised pressure of the breathing air of improved quality to be supplied by the device according to the invention may be provided by means of the aircraft air-conditioning system, which feeds air to the feed line of the device according to the invention. Alternatively, the device according to the invention for improving the breathing air quality in an aircraft air-conditioning system may however also comprise a separate pressure-generating device, such as for example a pump, a compressor or the like.

The locally delimited area of the aircraft air-conditioning system that is supplied with breathing air of improved quality by the device according to the invention for improving the breathing air quality in an aircraft cabin preferably comprises an outlet port for the removal of stale air from the locally delimited area of the aircraft cabin. In the locally delimited area of the aircraft cabin the outlet port may establish a connection between the interior of the aircraft cabin and a region of the fuselage disposed outside of the interior of the aircraft cabin. The outlet port may however alternatively be formed in a separating device that separates the locally delimited area of the aircraft cabin from a region of the aircraft cabin that surrounds the locally delimited area. The outlet port may then open out directly into the region of the aircraft cabin that surrounds the locally delimited area. Preferably, however, the outlet port is connected to a discharge line that connects the outlet port of the locally delimited area of action of the device according to the invention for example to the aircraft air-conditioning system. Via the discharge line the stale air from the locally delimited area of the aircraft cabin may then be supplied to the aircraft air-conditioning system for conditioning, i.e. in particular for dehumidification and enrichment with fresh air. It is consequently possible to effectively prevent the condensation of water in the locally delimited area of the air-conditioning system that is supplied with breathing air of higher air humidity by the device according to the invention for improving the breathing air quality. Where desired, the discharge line may also be connected to a suction device, which is integrated into the aircraft air-conditioning system or constructed separately and which, where necessary, allows stale air to be extracted from the locally delimited area of the aircraft cabin that is supplied with breathing air by the device according to the invention for improving the breathing air quality.

The outlet port of the locally delimited area of the aircraft cabin preferably comprises a pressure relief valve. Particularly if the device according to the invention for improving the breathing air quality comprises a separating device for separating the locally delimited area of action of the device from a region of the aircraft cabin surrounding the area of action of the device and/or is designed to feed the breathing air of improved quality at a raised pressure to the locally delimited area of action in the aircraft cabin, such a design of the outlet port makes it possible to effectively prevent the occurrence of an excess pressure in the locally delimited area of action of the device according to the invention for improving the breathing air quality.

The oxygen source of the device according to the invention for improving the breathing air quality in an aircraft cabin may comprise an oxygen reservoir designed for example in the form of a solid reservoir, a chemical generator, a compressed-gas reservoir or a liquid gas reservoir. Alternatively or additionally the oxygen source may however also comprise an oxygen production system, which where necessary produces oxygen when the aircraft is cruising. In the oxygen production system it is possible to use for example a molecular sieve oxygen concentrator, a hollow fibre filter or the like. Compared to an arrangement having an oxygen supply that depends exclusively upon an oxygen reservoir, an arrangement equipped with an oxygen production system, especially if the arrangement is provided for long-time operation during long-haul flights, may be realized with a reduced weight.

The water source of the device according to the invention for improving the breathing air quality in an aircraft cabin is preferably connectable to the feed line via an air humidifier. For example, the feed line may comprise a line portion running through the air humidifier as well as a bypass portion running past the air humidifier, wherein the air flow through the line portion running through the air humidifier and the bypass portion of the feed line, respectively, may be selectively controlled by means of a suitable valve, for example an electronically controllable solenoid valve. By means of the air humidifier, which is supplied with water from the water source, the breathing air that is provided by the device according to the invention for improving the breathing air quality in an aircraft cabin may be humidified in a simple manner. The air humidifier may be designed as a component of the device according to the invention for improving the breathing air quality. The air humidifier may however alternatively also be integrated into the aircraft air-conditioning system.

The water source of the device according to the invention for improving the breathing air quality in an aircraft cabin may comprise a water storage tank for receiving the water for humidifying the breathing air of improved quality that is provided by the device according to the invention. Alternatively or additionally the device according to the invention may comprise a device for collecting condensation water from the aircraft cabin, from an aircraft engine or some other system of the aircraft, such as for example the aircraft air-conditioning system, the aircraft galleys or fuel cells provided on board the aircraft. If the device according to the invention comprises a device for collecting condensation water, it is possible to dispense with carrying additional water or the quantity of additionally carried water may be reduced, this having an advantageous effect upon the weight of the device according to the invention for improving the breathing air quality in an aircraft cabin.

BRIEF DESCRIPTION OF THE DRAWINGS

Preferred embodiments of the device according to the invention for improving the breathing air quality in an aircraft cabin are now described in detail with reference to the accompanying diagrammatic figures, wherein:

FIG. 2 shows a second embodiment of a device according to the invention for improving the breathing air quality in an aircraft cabin and FIG. 3 shows a third embodiment of a device according to the invention for improving the breathing air quality in an aircraft cabin.

DETAILED DESCRIPTION

Figure 1:
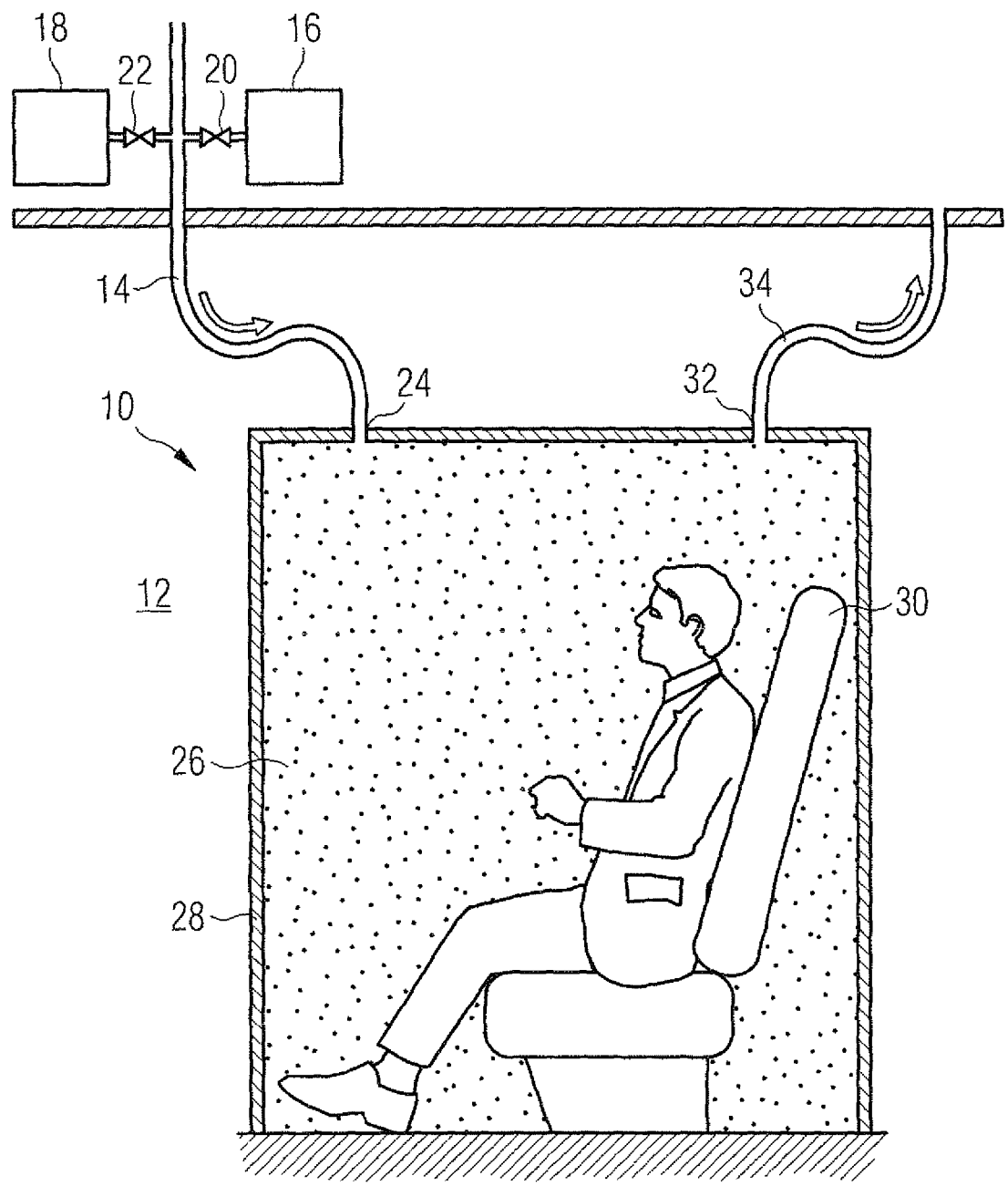
FIG. 1 shows a first embodiment of a device according to the invention for improving the breathing air quality in an aircraft cabin.

A device 10 for improving the breathing air quality in an aircraft cabin 12 which is shown in FIG. 1 comprises a feed line 14, which is connected at a first end to an air outlet, which is not shown in FIG. 1, of an aircraft air-conditioning system. Through the air outlet of the aircraft air-conditioning system air that is to be supplied to the aircraft cabin 12 is introduced into the feed line 14. The feed line 14 of the device 10 is selectively connectable to an oxygen source 16 and/or a water source 18 in order, where necessary, to oxygenate and/or humidify air flowing through the feed line 14.

The oxygen source 16 of the device 10 for improving the breathing air quality in an aircraft cabin 12 comprises an oxygen production system having a molecular sieve oxygen concentrator. The oxygen source 16 may however alternatively also be equipped with a differently designed oxygen production system and/or an oxygen reservoir. The water source 18 of the device 10 comprises a water storage tank, which is supplied with water by a device for collecting condensation water from an aircraft engine. The water source 18 may however alternatively also be equipped without a water storage tank and/or with a device for collecting condensation water from another system of the aircraft, such as for example the aircraft cabin, the aircraft air-conditioning system, the aircraft galleys or fuel cells provided on board the aircraft. Control of the oxygen enrichment and the humidification of the air flowing through the feed line 14 is effected by means of electronically controllable valves 20, 22, which are adapted so as to connect the oxygen source 16 and the water source 18 selectively to the feed line 14.

At a second end opposite its first end the feed line 14 is connected to an inlet port 24 of a locally delimited area 26 of the aircraft cabin 12. The inlet port 24 is designed in the form of a nozzle and is therefore particularly suitable for feeding breathing air, which is passed through the feed line 14, to the locally delimited area 26 of the aircraft cabin 12 at a pressure that exceeds the pressure in the region of the aircraft cabin 12 that surrounds the locally delimited area 26. The raised pressure of the air flowing through the feed line 14 is provided by an aircraft air-conditioning system, so that the air flowing through the feed line 14 is already at a raised pressure when it is conveyed out of the air outlet of the aircraft air-conditioning system into the feed line 14.

The locally delimited area 26 of the aircraft cabin 12 is separated from the region of the aircraft cabin 12 surrounding the locally delimited area 26 by means of a separating device, which is designed in the form of a person cabin 28. The person cabin 28 surrounds a seat 30 disposed in the aircraft cabin 12 and provides enough room for a person sitting on the seat 30. As the breathing air of improved quality is fed to the inlet port 24 at a raised pressure by the feed line 14, the person cabin 28 does not have to be of a completely sealed design.

In order to prevent the condensation of water in the locally delimited area 26 of the aircraft cabin 12 that is supplied with breathing air of improved quality by the device 10, the person cabin 28 has an outlet port 32 that is connected by a discharge line 34 to the aircraft air-conditioning system. The stale air from the locally delimited area 26 of the aircraft cabin 12 may be fed through the discharge line 34 to the aircraft air-conditioning system for conditioning, i.e. for dehumidification and enrichment with fresh air. To prevent the occurrence of an excess pressure in the locally delimited area of action 26 of the device 10 for improving the breathing air quality, the outlet port 32 comprises a pressure relief valve, which is not represented in detail in FIG. 1.

During operation of the device 10 for improving the breathing air quality in an aircraft cabin 12 the valves 20, 22 are suitably controlled by an electronic control unit, which is not shown in FIG. 1, in order to adjust a desired oxygen partial pressure and/or a desired moisture content of the air flowing through the feed line 14. The adjustment of the oxygen partial pressure and/or the air humidity may be geared to the needs of the person situated in the person cabin 28. This allows the comfort of this person to be considerably improved, especially on long-haul flights.

Figure 2:
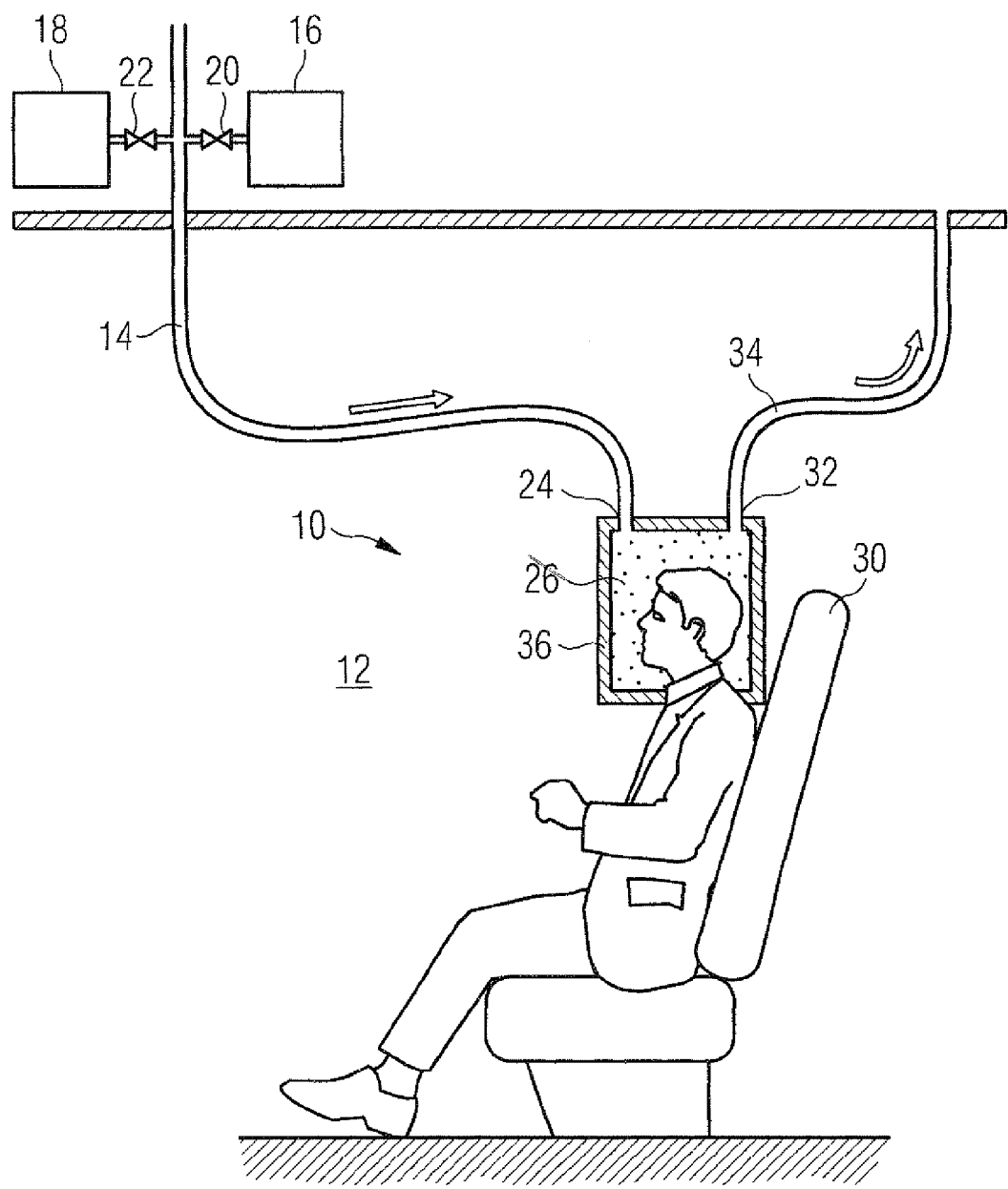

A device 10 for improving the breathing air quality in an aircraft cabin 12 is shown in FIG. 2 and differs from the system represented in FIG. 1 only in that the separating device, which separates the locally delimited area of action 26 of the device 10 from the region of the aircraft cabin 12 that surrounds the locally delimited area 26, is designed no longer as a person cabin 28 but in the form of a hood 36, which is capable of accommodating the head of a person to be supplied with breathing air of improved quality. Compared to the hood 36 shown in FIG. 2, the person cabin 28 offers greater comfort to the person to be supplied with breathing air of improved quality. The device 10 for improving the breathing air quality that is equipped with a hood 36 is however notable for a reduced oxygen- and water consumption compared to a device comprising a person cabin 28. Otherwise, the structure and the mode of operation of the device 10 according to FIG. 2 correspond to the structure and the mode of operation of the system shown in FIG. 1.

Finally, the device 10 for improving the breathing air quality in an aircraft cabin 12 that is shown in FIG. 3 differs from the arrangements shown in FIGS. 1 and 2 in that the separating device for separating the locally delimited area of action 26 of the device 10 from a region of the aircraft cabin 12 surrounding the locally delimited area 26 is designed in the form of a half-shell mask 38, which may be placed over the facial region of a person that is to be supplied with breathing air of improved quality. Through the use of a mask that is to be placed over the facial region of a person that is to be supplied with breathing air of improved quality, a further reduction of the oxygen- and water consumption of the device 10 is possible. Otherwise, the structure and the mode of operation of the device 10 for improving the breathing air quality in an aircraft cabin 12 that is represented in FIG. 3 correspond to the structure and the mode of operation of the arrangements shown in FIGS. 1 and 2.

The invention claimed is:

1. A device for improving the breathing air quality for the crew and/or the passengers in an aircraft cabin including a locally delimited area and a region surrounding the locally delimited area, the device comprising:
an oxygen source,
a water source, and
a feed line,
wherein the feed line is connectable to the oxygen source and the water source in order to oxygenate and/or humidify air that is introduced into the feed line,
wherein the feed line is further connected to an inlet port of the locally delimited area of the aircraft cabin and adapted so as to feed oxygenated and/or humidified air having a first oxygen partial pressure to the locally delimited area of the aircraft cabin during normal operation of the aircraft, the first oxygen partial pressure being higher than a second oxygen partial pressure located in the region surrounding the locally delimited area, and
wherein the feed line feeds oxygenated and/or humidified air to the locally delimited area of the aircraft cabin at a third oxygen partial pressure that is higher than the first oxygen partial pressure during emergency operation of the aircraft, such that the feed line is used as an emergency oxygen supply system during depressurization of the aircraft cabin.

2. The device of claim 1, wherein the feed line is connected to an inlet port of a separating device, which is adapted so as to separate the locally delimited area of the aircraft cabin from the region of the aircraft cabin that surrounds the locally delimited area.

3. The device of claim 2, wherein the separating device is designed in the form of a person cabin, a hood suitable for accommodating the head of a person, or a mask that may be placed over the facial region of a person.

4. The device of claim 1, wherein the feed line is connected to an inlet port designed in the form of a nozzle.

5. The device of one claim 1, further comprising a discharge line, which is connected to an outlet port of the locally delimited area of the aircraft cabin and is adapted so as to remove stale air from the locally delimited area of the aircraft cabin.

6. The device of claim 5, wherein the outlet port of the locally delimited area of the aircraft cabin comprises a pressure relief valve.

7. The device of claim 1, wherein the oxygen source comprises an oxygen reservoir, which is designed in the form of a solid reservoir, a chemical generator, a compressed-gas reservoir or a fluid gas reservoir, and/or an oxygen production system that comprises a molecular sieve oxygen generator or a hollow fibre filter.

8. The device of claim 1, wherein the water source is connectable to the feed line via an air humidifier.

9. The device of claim 1, wherein the water source comprises a water storage tank and/or a device for collecting condensation water from the aircraft cabin, an aircraft engine, an aircraft air-conditioning system, an aircraft galley, a fuel cell provided on board the aircraft or from some other system of the aircraft.

10. A method of supplying air into an aircraft cabin including a locally delimited area and a region surrounding the locally delimited area, the method comprising:

oxygenating the air with an oxygen source, humidifying the air with a water source, feeding the oxygenated and humidified air at the first oxygen partial pressure through a feed line into the locally delimited area during normal operation of the aircraft, the first oxygen partial pressure being higher than a second oxygen partial pressure in the region surrounding the locally delimited area, and feeding the oxygenated and humidified air at a third oxygen partial pressure higher than the first oxygen partial pressure through the feed line into the locally delimited area during emergency operation of the aircraft, such that the feed line is used as an emergency oxygen supply system during depressurization of the aircraft cabin.

* * * * *